(12) United States Patent
Schaffert (10) Patent No.: US 9,155,244 B2
(45) Date of Patent: Oct. 13, 2015

(54) FURROW TOOL FOR SEED PLACEMENT (75) Inventor: Paul E. Schaffert, Indianola, NE (US)

(73) Assignee: SCHAFFERT MANUFACTURING COMPANY, INC., Indianola, NE (US)

(*) Notice: Subject to any disclaimer, the term of this patent is extended or adjusted under 35 U.S.C. 154(b) by 498 days.

(21) Appl. No.: 13/365,969

(22) Filed: Feb. 3, 2012

(65) Prior Publication Data
US 2012/0312209 A1 Dec. 13, 2012

Related U.S. Application Data (60) Provisional application No. 61/439,254, filed on Feb. 3, 2011.

(51) Int. Cl.
A01C 5/00 (2006.01)
A01C 7/20 (2006.01)
A01C 5/06 (2006.01)

(52) U.S. Cl.
CPC ............... A01C 7/206 (2013.01); A01C 5/066 (2013.01); A01C 7/201 (2013.01)

(58) Field of Classification Search
USPC .......... 111/118, 120, 124, 150, 189, 190, 197
See application file for complete search history.

(56) References Cited

U.S. PATENT DOCUMENTS

| 13,683 | A | 10/1855 | McCormick |
| 35,510 | A | 6/1862 | De Haven |
| 122,299 | A | 12/1871 | Wight et al. |
| 176,708 | A | 4/1876 | Templin |
| 183,947 | A | 10/1876 | Lewis |
| 203,207 | A | 4/1878 | Springer |
| 211,601 | A | 1/1879 | Springer |
| 221,004 | A | 10/1879 | Steaybe |
| 252,265 | A | 1/1882 | Scofield |
| 288,661 | A | 11/1883 | Purdy et al. |
| 308,327 | A | 11/1884 | Runstetler |
| 322,841 | A | 7/1885 | Miskimen |
| 410,438 | A | 9/1889 | Patric |
| 555,897 | A | 3/1896 | Crane |
| 789,798 | A | 5/1905 | Deterding |
| 889,947 | A | 6/1908 | Miller |
| 909,137 | A | 1/1909 | Bellerive |
| 1,104,602 | A | 7/1914 | Akers |

(Continued)

FOREIGN PATENT DOCUMENTS

| DE | 3114771 | 10/1982 |
| DE | 3321490 | 12/1984 |
| DE | 3441610 | 5/1986 |

OTHER PUBLICATIONS

Finck, Charlene; Put Seed in Its Place; Farm Journal, pp. 16-17 (Jan. 1995).

(Continued)

Primary Examiner — Alicia Torres
(74) Attorney, Agent, or Firm — Dorsey & Whitney LLP (57) ABSTRACT A furrow tool configured to attach to a planting device includes a compressor including a neck portion and a body extending from the neck portion. A deflector is connected to the compressor. The deflector includes a top portion connected to the neck portion and an extension portion. The extension portion is located beneath a bottom side of the body and may be configured to deflect seeds. The furrow tool also includes an attachment mechanism connected to the neck portion and configured to attach to the planting device.

20 Claims, 8 Drawing Sheets (56) References Cited

U.S. PATENT DOCUMENTS

| | | |
|---|---|---|
| 1,473,297 A | 11/1923 | Knight |
| 1,691,466 A | 11/1928 | Burtner |
| 1,934,490 A | 11/1933 | Elliot |
| 2,096,230 A | 10/1937 | William |
| 2,533,374 A | 12/1950 | Hyland |
| 2,554,205 A | 5/1951 | Oehler |
| 2,849,969 A | 9/1958 | Taylor |
| 2,872,883 A | 2/1959 | Padrick |
| 3,336,885 A | 8/1967 | Lebow |
| 4,108,089 A | 8/1978 | van der Lely |
| 4,148,267 A | 4/1979 | Bennett et al. |
| 4,253,412 A | 3/1981 | Hogenson |
| 4,276,836 A | 7/1981 | Pust |
| 4,373,455 A | 2/1983 | Friggstad |
| 4,420,516 A | 12/1983 | Wolfgange et al. |
| 4,445,445 A | 5/1984 | Sterrett |
| 4,446,801 A | 5/1984 | Butuk et al. |
| 4,542,705 A | 9/1985 | Orth |
| 4,565,141 A | 1/1986 | Kopecky |
| 4,580,507 A | 4/1986 | Dreyer et al. |
| D285,205 S | 8/1986 | Johnson |
| 4,607,581 A | 8/1986 | Kopecky |
| 4,628,841 A | 12/1986 | Powilleit |
| 4,671,193 A | 6/1987 | States |
| 4,674,419 A | 6/1987 | Kopecky |
| 4,911,090 A | 3/1990 | Schimke |
| 5,092,255 A | 3/1992 | Long et al. |
| 5,375,542 A | 12/1994 | Schaffert |
| 5,425,318 A | 6/1995 | Keeton |
| 5,640,915 A | 6/1997 | Schaffert |
| 5,673,638 A | 10/1997 | Keeton |
| 5,730,074 A | 3/1998 | Peter |
| 5,852,982 A | 12/1998 | Peter |
| 5,918,557 A | 7/1999 | Schaffert |
| 5,996,514 A | 12/1999 | Arriola et al. |
| 6,082,274 A | 7/2000 | Peter |
| 6,082,275 A | 7/2000 | Schaffert |
| 6,119,608 A | 9/2000 | Peterson et al. |
| 6,209,466 B1 | 4/2001 | Wodrich |
| 6,220,191 B1 | 4/2001 | Peter |
| 6,283,050 B1 | 9/2001 | Schaffert |
| 6,453,832 B1 | 9/2002 | Schaffert |
| 6,530,334 B2 | 3/2003 | Hagny |
| 6,763,773 B2 | 7/2004 | Schaffert |
| 7,121,216 B2 | 10/2006 | Schaffert |
| 7,552,689 B2 | 6/2009 | Schaffert |
| 2005/0263053 A1 | 12/2005 | Schaffert |

OTHER PUBLICATIONS

Keeton Seed Firmer; J & K Enterprises (1994 Brochure).
Keeton Seed Firmer, Precision Planting (Brochure), Date of publication of brochure is unknown.
"Keeton Seed Firmer", Precision Planting, http://precisionplanting.com/html/keeton.html, web page printed on Dec. 30, 2000.
Seed to Soil Inforcer; Seed Flap (Spring 1995).
Tube Alignment Brackets; M & J Cotton Farms, Inc. Brochure.—No date.

FURROW TOOL FOR SEED PLACEMENT

CROSS-REFERENCE TO RELATED APPLICATIONS

This application claims the benefit, under 35 U.S.C. 119 (e), of U.S. provisional application No. 61/439,254, entitled "Furrow Tool for Seed Placement" and filed on Feb. 3, 2011. The entire contents of this application are hereby incorporated herein by reference in its entirety.

TECHNICAL FIELD

The technical field relates generally to agricultural planting equipment, and more specifically to seed placement tools.

BACKGROUND

Mechanical seed planting devices are used to plant seeds accurately in furrows formed in a field. Planting devices are often pulled by a tractor and include multiple planting units. Each planting unit may hold seeds and may include a device to create a furrow in the ground as the tractor moves forward, and a device for closing the furrow around the seeds.

The seed placement in the furrow can affect the growth and characteristics of the plant. Often times as the seed drops from the planter into the furrow, via the seed tube, the seed may bounce. This bouncing may impact the direction and location of the seed distribution within the furrow. Additionally, as the seed may be traveling quickly through the seed tube, the seed may even bounce off of the ground at the bottom of the furrow, altering its location. The bouncing down the seed tube, or off the ground, may place the seeds on the side of the furrow or even outside the furrow. After the seed is placed within the furrow the furrow may be closed by the furrow closers. If the seeds are placed improperly (e.g., on the side of the furrow or outside the furrow completely), the seeds may not be adequately covered by soil.

Also, as seeds are deposited within the furrows even if they do not bounce out of place, they may still not be deposited at the correct depth. Often times there may be residual soil that may cause air pockets underneath the seed. Therefore, it may be desired to push or press the seed into place to better ensure that the planting depth may be accurate.

The plant depth and location affects the growth aspects of the plants. For example, improper seed placement may result in uneven plant emergence, poor strands, increase in weed population, uneven plant maturity, longer insect lift, higher susceptibility to chemical damage and lower yields.

SUMMARY

Some embodiments of a furrow tool may take the form of a furrow tool configured to attach to a planting device. The furrow tool may include a compressor or tool. The compressor may include a neck portion and a body extending from the neck portion. A deflector may be connected to the compressor. The deflector may include a top portion connected to the neck portion and an extension portion. The extension portion may be located beneath a bottom side of the body and may be configured to deflect seeds into a proper location in the furrow. The furrow tool may also include an attachment mechanism connected to the neck portion and configured to attach to the planting device.

Other embodiments include a planting tool configured to be attached to a planter row unit including a furrow creating device and a seed tube. The planting tool may include an attachment bracket configured to attach the planting tool to the seed tube. The planting tool may also include a compressor and a deflector connected to the attachment bracket. The compressor may include a neck portion connected to the attachment bracket and a body extending from the neck portion. The body may have a greater height than the neck portion. The deflector may be located beneath a bottom face of the compressor. The deflector may have a shorter length than the compressor, and the compressor may extend beyond a back end of the deflector.

BRIEF DESCRIPTION OF THE DRAWINGS

Exemplary embodiments are illustrated in referenced figures of the drawings. It is intended that the embodiments and figures described and shown herein are to be considered illustrative rather than limiting. The use of the same reference numerals in different drawings indicates similar or identical items.

DETAILED DESCRIPTION

Although one or more of the embodiments of a seed planting tool may be described in detail with reference to a particular seed planting tool, the embodiments should not be interpreted or otherwise used as limiting the scope of the claims. In addition, one skilled in the art will understand that the following description has broad application. For example, while embodiments of the seed planting tool described herein may focus on seed location and depth, the concepts described herein equally apply to other planting and fertilization aspects. In addition, while the described embodiments may focus on a particular shaped furrow, the concepts set forth herein may equally apply to other furrow types and shapes, as well as to non-furrow planting. Accordingly, the discussion of any embodiment is meant only to be exemplary and is not intended to suggest that the scope of the claims is limited to these embodiments.

Figure 1:
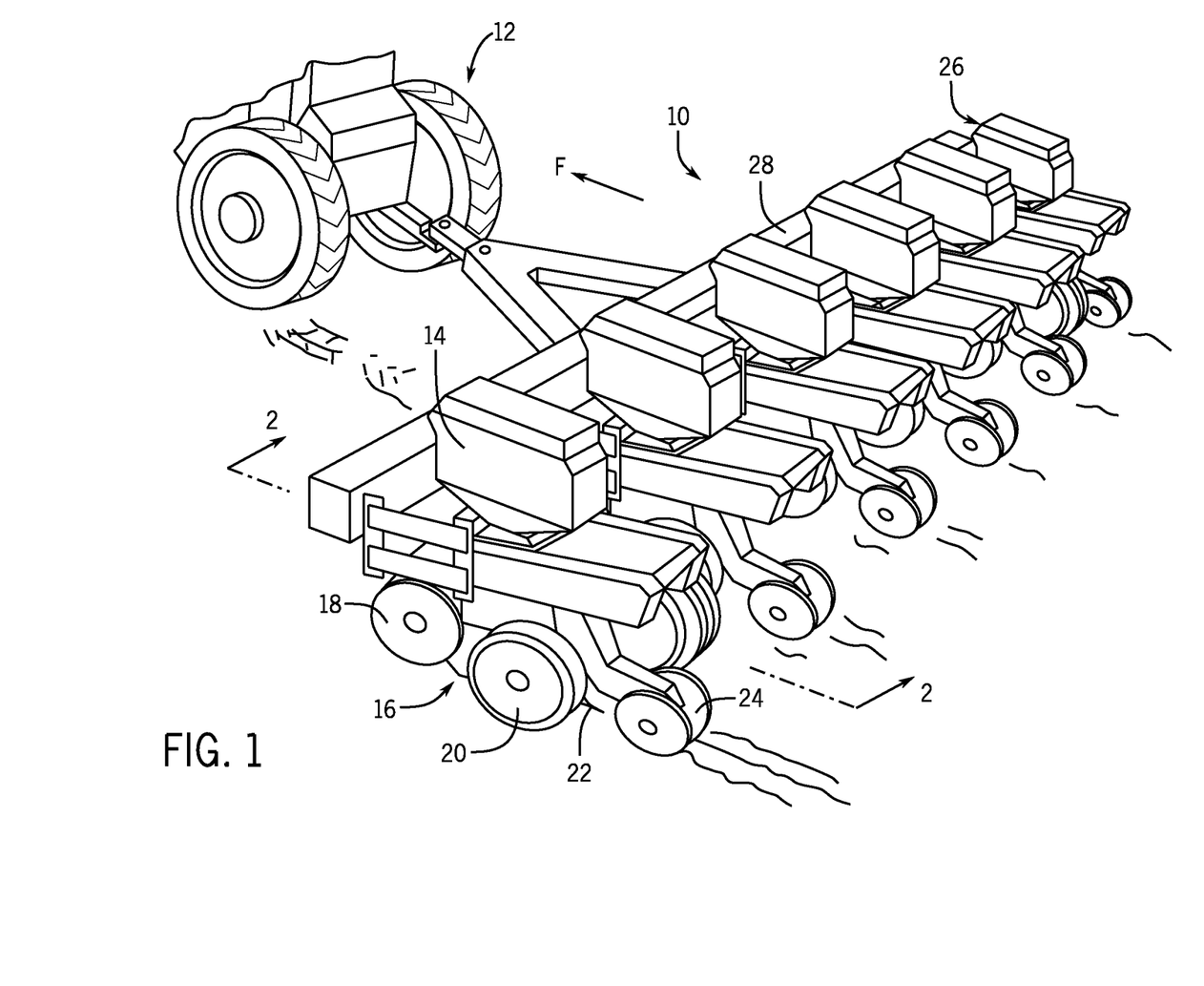
FIG. 1 is a perspective view of a tractor pulling a planter having a multiple row units.
Figure 2:
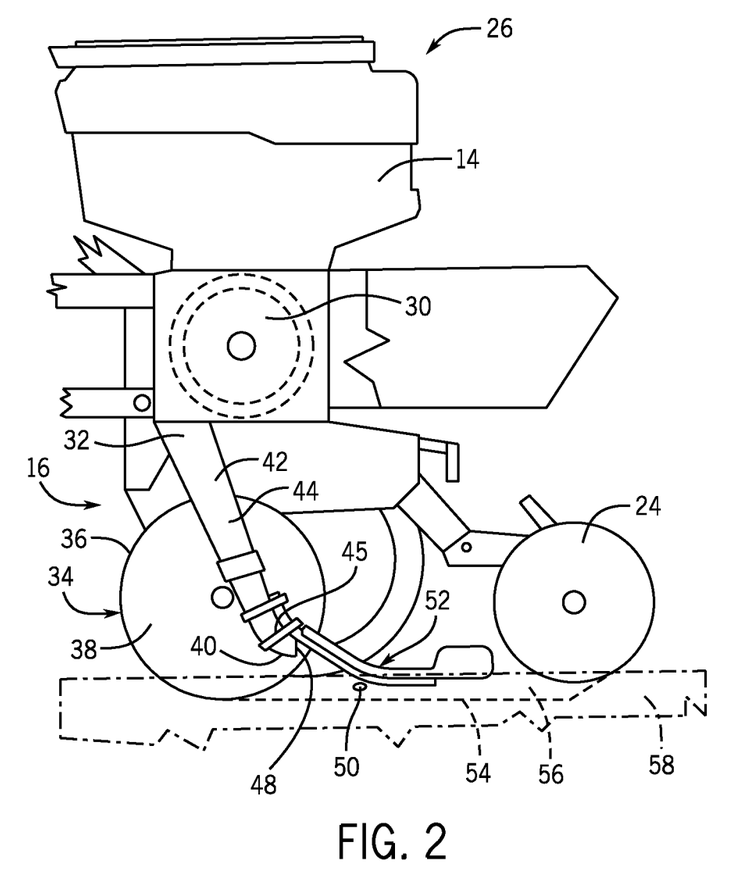
FIG. 2 is a section taken along line 2-2 in FIG. 1, and illustrates a row unit including the furrow tool.

In some embodiments, a fertilizer tool is described that may be used with a variety of drills and planters. FIG. 1 illustrates an agricultural planter 10 that includes a number of planter row units 26 mounted on a main frame member 28. FIG. 2 illustrates a section view along line 2-2 of the planter 10 in FIG. 1, showing a single planter row unit 26. Referring to FIGS. 1 and 2, each of the row units 26 may form a seed furrow 56 and may deposit seeds 50 within the furrow 56. A furrow tool 52 may substantially prevent the seeds 50 from bouncing as they are deposited into the furrow 56 as well as press the seeds 50 into the furrow 56. The furrow tool 52 furthermore helps position the seeds 50 at the correct lateral location and depth within the furrow 56, which minimizes the risk that the seeds 50 will be incorrectly positioned or set atop air pockets within the soil.

The row unit 26 may include a seed hopper 14 that contains and dispenses the seeds 50, and a seed metering unit 30 may be positioned below the seed hopper 14. Additionally, the row unit 26 may include a fertilizer or watering tank (not shown) to provide nutrients to the seeds that are placed in the furrow 56. The seed metering unit 30 may receive seeds from the seed hopper 14. The seed metering unit 30 may facilitate depositing the correct number of seeds 50 in the furrow 56. Below the seed metering unit 30 may be a seed tube 42. The seed tube 42 may receive seeds from the seed hopper 14 (via the seed metering unit 30) and deposit the seeds 50 within the furrow 56. The row unit 26 may additionally include a furrow opening apparatus 16 that penetrates the ground to open the furrow 56. The furrow opening apparatus 16 may be placed beneath the seed hopper 14. The furrow opening apparatus 16 may include a divider at the leading edge of the row unit 26 and a furrow opener 34. The furrow opener 34 may be placed centrally underneath the seed hopper 14. The furrow opener 34 may be partially encompassed by a pair of gage wheels 20 and a pair of furrow closer wheels 24. The furrow close wheels 24 may trail behind the furrow opener 34 and gage wheels 20.

The furrow 56 may be formed by the furrow opener 34 as the row unit 26 is pulled by the planter. There are many different types of furrow openers. A double disk furrow opener 38 is illustrated in FIGS. 1 and 2. The double disk furrow opener 38 may include two circular blades that are rotatably mounted to the row unit 26. The double disk furrow opener 38 may be configured to form a V-shaped furrow 56 at a predetermined depth within in the soil. However, other furrow openers 34 may be used to create a variety of furrow shapes and/or sizes.

The seed tube 42 may extend downward from the metering unit 30. The seed tube 42 may be positioned between the disk blades of the furrow opener 34. The seed tube 42 may include a bottom portion 40 that curves to generally define an acute angle between the ground and a longitudinal centerline of the seed tube 42. An opening 48 of the seed tube 42 may partially face the furrow tool 52. The seed tube 42 may be positioned over the furrow 56 to distribute seeds 50 received from the metering unit 30 into the furrow 56. As the metering unit 30 regulates the number of seeds distributed from the seed hopper 14, each seed 50 may be placed within the furrow 56 at a predetermined distance away from adjacent seeds 50. The seed tube 42 may have a substantially hollow body 44, and a bottom end of the seed tube 42 may be positioned to be directly over a centerline of the furrow 56. The bottom end 40 of the seed tube 42 may include the opening 48 through which the seeds 50 may exit the seed tube 42. The seed tube 50 may include a slightly arcuate shape along its length in a rearward direction. Such a shape may help to place the seeds 50 at the correct location within the furrow 56. As the seeds 50 travel through the seed tube 50, the seeds 50 may bounce as a result of the interaction with the walls of the seed tube 42 and the movement and velocity of the planter 10 over the ground.

The furrow tool 52 may be attached to the bottom portion 40 of the seed tube 42. The furrow tool 52 facilitates placing the seeds 50 in the proper location in the furrow 56 even though the seeds 50 may bounce within the seed tube 42. The furrow tool 52 may also press or compress the seeds 50 within the furrow 56 after they have been deposited therein. In these embodiments, the furrow tool 52 may help to position the seeds 50 at the correct depth and location within the furrow 56, which may result help in better plant growth and development rates. The furrow tool 52, in some embodiments, may include a deflector 62 or seed tube extension and a compressor 60. The furrow tool 52 may contact the seeds 50 both before and after the seeds 50 are deposited within the furrow 56. In these embodiments, the deflector 62 may contact the seeds 50 to facilitate placing the seeds 50 in a desired lateral location in the furrow 56, and the compressor 60 may then contact the seeds 50 to facilitate placing them at the correct depth within the furrow 56.

Figure 3:
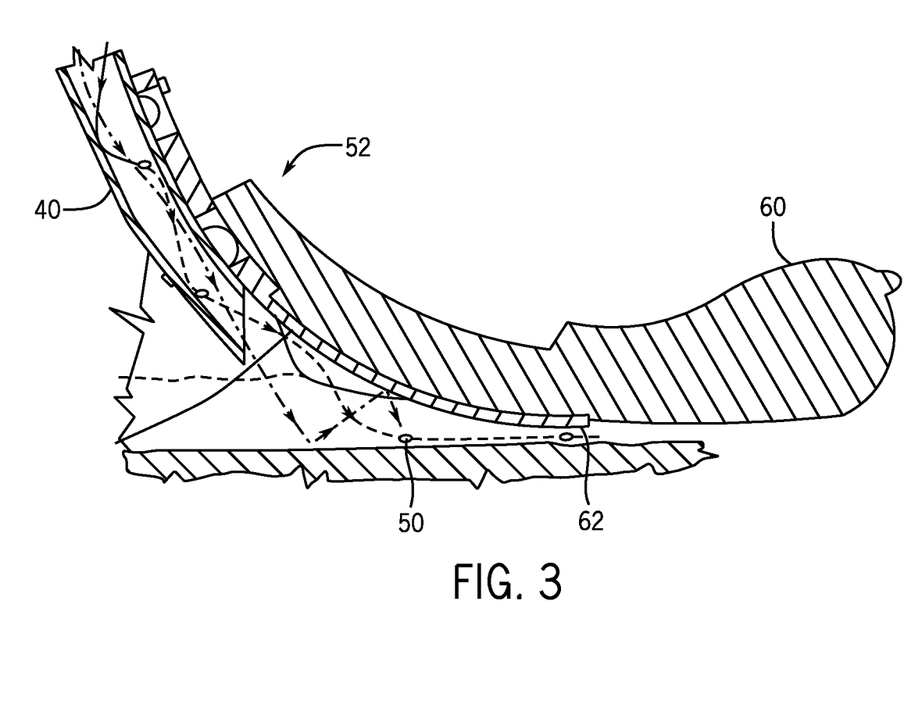
FIG. 3 is an enlarged view of the furrow tool of FIG. 1 attached to the seed tube.

Turning to FIG. 3, the seeds 50 may bounce off the seed tube 42 in a variety of directions as the planter 10 moves. However, as the seeds 50 exit the seed tube 42, the seeds 50 hit the deflector 62. Regardless of whether the seeds 50 bounce off of the seed tube 42 and hit the deflector 62 or bounce off of the ground and hit the deflector 62, the seeds 50 generally end up placed in the desired location. Thus, in some embodiments, the deflector 62 may not act to substantially decrease the bouncing of the seeds 50 within the seed tube 42 but rather act to place the seeds 50 at the desired location in the furrow 56, even if the seeds 50 bounce significantly. However, some seeds 50 may not contact the deflector 62. This may occur if the seeds 50 do not bounce significantly inside the seed tube 42.

Once the seeds 50 are placed into the furrow 56, the compressor 60 passes over the seeds 50. The compressor 60 helps to position the seeds 50 at the correct depth within the furrow 56. In some embodiments, the compressor 60 may press the seeds 50 into the furrow bottom. In some embodiments, the compressor 60 may also compress soil/earth in the furrow to eliminate any air pockets. By eliminating the air pockets and compressing the soil, the seeds 50 can settle into the desired depth within the furrow 56. Furthermore, by compressing the seeds 50 into the furrow 56, the seeds 50 are more likely to be planted at a uniform planting depth. The compressor 60 may be configured to provide varying pressure to the seeds 50. For example, altering the material, size or attachment location the compressor 60 may result in the application of more or less force to the seeds 50, thus allowing the furrow tool 52 to be used with a variety of seeds 50.

Figure 4:
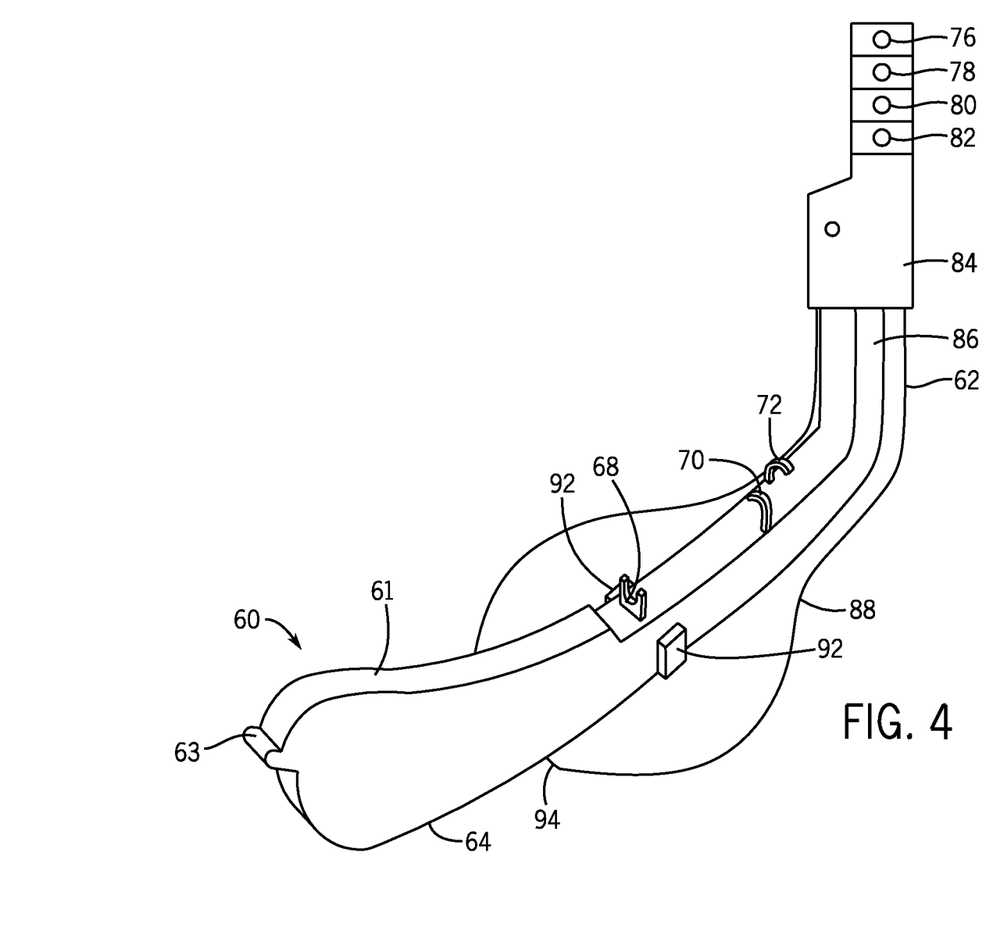
FIG. 4 is a front perspective view of the furrow tool of FIG. 3 removed from the seed tube.
Figure 5:
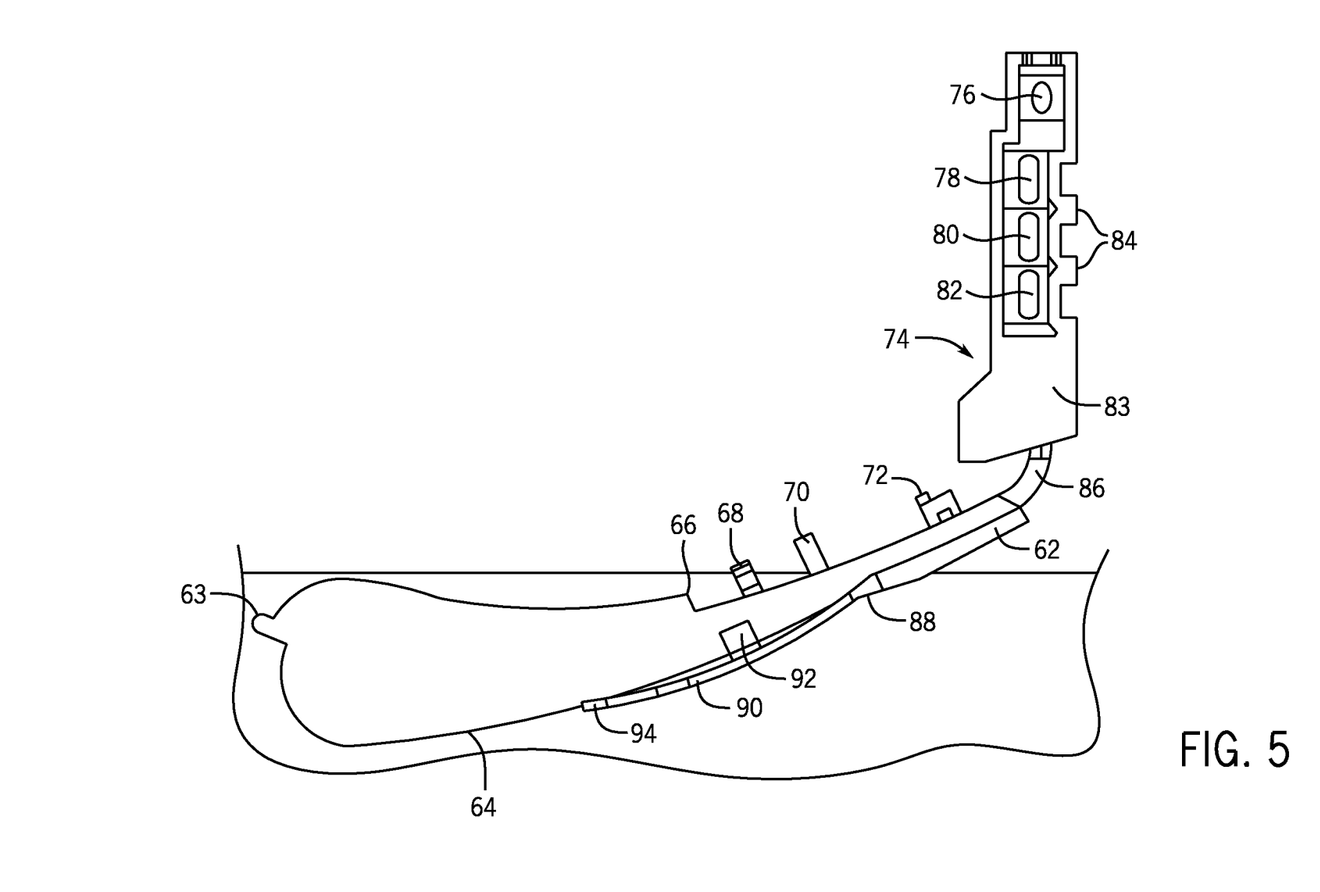
FIG. 5 is side elevation view of the furrow tool illustrated in FIG. 4.
Figure 6:
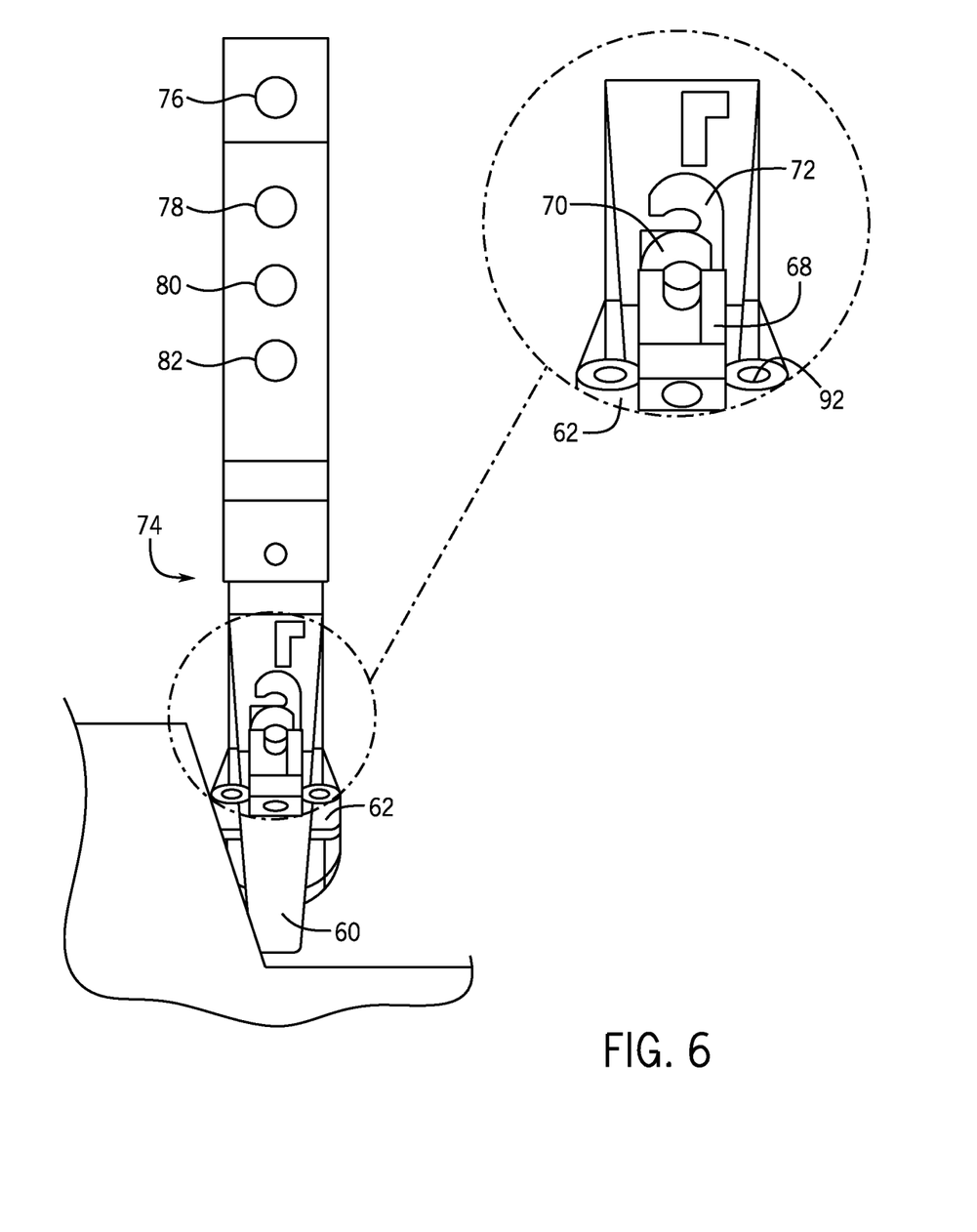
FIG. 6 is a front elevation view of the furrow tool illustrated in FIG. 4.

FIG. 4 illustrates a front top perspective view of the furrow tool 52 detached from the seed tube, FIG. 5 illustrates a side elevation view of the furrow tool 52, and FIG. 6 illustrates a front elevation view of the furrow tool 52. Referring now to FIGS. 4-6, the furrow tool 52 may be an integral construction, such that the compressor 60, the deflector 62 and the attachment bracket 74 may be a singular piece. In other embodiments, the furrow tool 52 may include separate elements attached together, or a combination of integral elements with separately attached elements. For example, the compressor 60 may be integral with the attachment bracket 74, such as shown in FIG. 4, and the deflector 62 may be a separate attachment.

The compressor 60, the deflector 62, and the attachment bracket 74 may be formed using the same or similar same materials, or they may be formed using different materials. In some embodiments, the compressor 60 and the deflector 62 may be made of plastic, metal, wood, or the like.

The deflector 62 may be attached or connected to a bottom portion of the compressor 60, and the compressor 60 may extend past the end portion of the deflector 62. In these embodiments, when a seed 50 is released from the seed tube 42 and the seed 50 bounces, it may hit the deflector 62. After the seed 50 rests within the furrow 56, the compressor 60 may be dragged over the seed 50 to compress the seed 50 into the furrow 56. In these embodiments, the deflector 62 may initially contact the seeds 50 as they are dropped from the seed tube 42, and then the compressor 60 may contact the seeds 50 after they are deposited in the furrow 56. In some embodiments, the compressor 60 may have a longer total length than the deflector 62. This configuration may allow the compressor 60 to contact the seeds 50 after the deflector 62. Additionally, the deflector 62 may be configured so as to not contact the seeds 50 once they are deposited within the furrow 56. In these embodiments, the deflector 62 may not touch the furrow 56. This configuration may help to eliminate unnecessary pressure on the seeds 50, which may damage them.

The compressor 60 may have a lower total height where it attaches to the deflector 62, and may increase in height after the deflector 62. In these embodiments, the distal end of the compressor 60 may be significantly larger than the front end. The bottom portion 64 of the compressor 62 may be configured to press the seeds 50 into the furrow 56. As the bottom portion 64 of the compressor is dragged over the seeds 50 as the planter 10 pulls the furrow tool 52, the weight of the compressor 60 presses the seeds 50 into the furrow 56.

Figure 8:
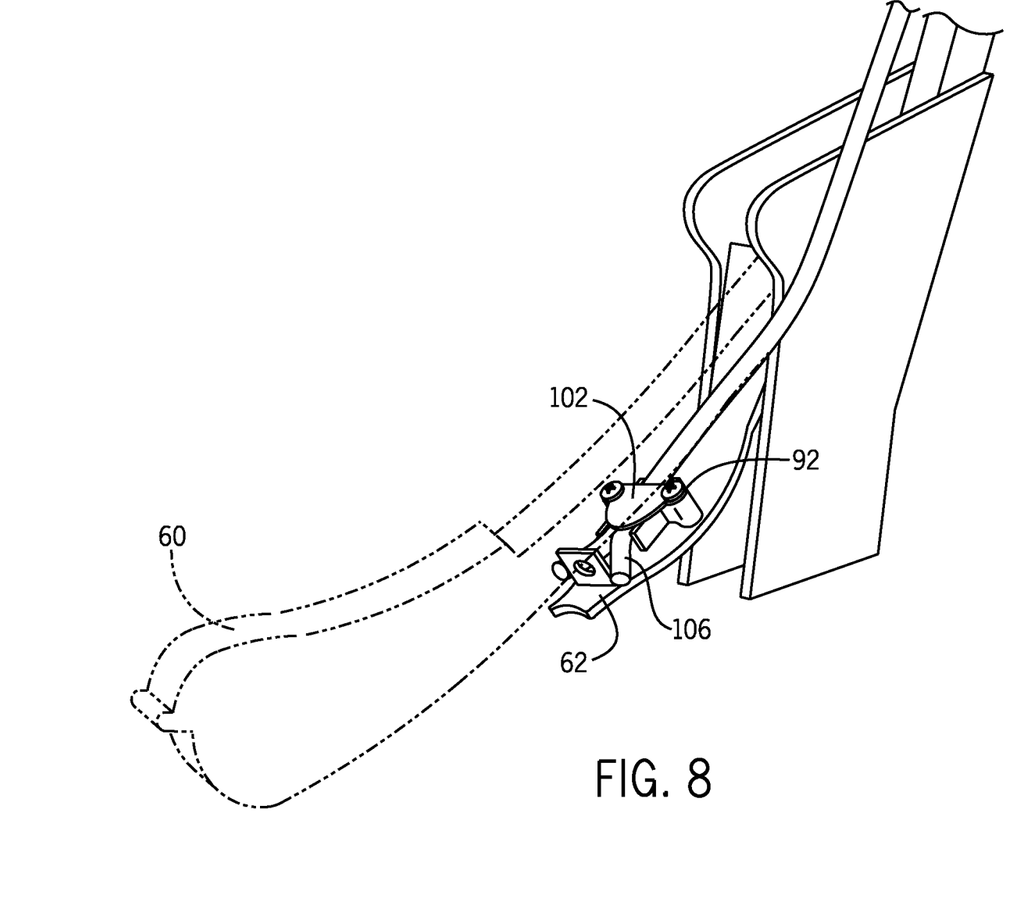
FIG. 8 is a top isometric view of another embodiment of the furrow tool illustrated in FIG. 4 with the furrow tool including a splitter for the nutrient tube.

The compressor 60 also may include an outer protrusion 63 extending from the back or distal end of the compressor body 60. The outer protrusion 63 may be used to hold a fertilizer tube. For example, as shown in FIG. 8, a fertilizer tube assembly may be attached to a top face of the compressor 60. In other embodiments, the outer protrusion 63 may be omitted. This may be done when a fertilizer tube is not added to the furrow tool.

The compressor 60 may include a compressor body. The compressor body may be generally oval shaped with a flat top face 61 and angled sides. The compressor body may expand in height from the front to the back end of the compressor body. In some embodiments, the compressor 60 may also include a step 66 at the transition point from the connection area to the back area of the compressor 60. The step 66 may be included to reduce the weight and material required to create the compressor 60. For example, the compressor 60 may be constructed to have a large height, which increases the weight of the compressor. This increased weight allows for a greater force to be applied to the seeds 50 by the compressor. However, the large height and/or weight may only be required for the portion of the compressor 60 that contacts the seeds 50. Therefore, the step 66 may reduce the amount of material used for the entire compressor 60, while still providing sufficient height and/or weight to press the seeds 50 into the furrow 56. The step 66 may also be used to allow the furrow tool 52 to be easily connected to the seed tube 42 and to maintain a desired spacing between the row unit 26 (e.g., the discs, the wheels, etc.) and the furrow tool 52.

Figure 7:
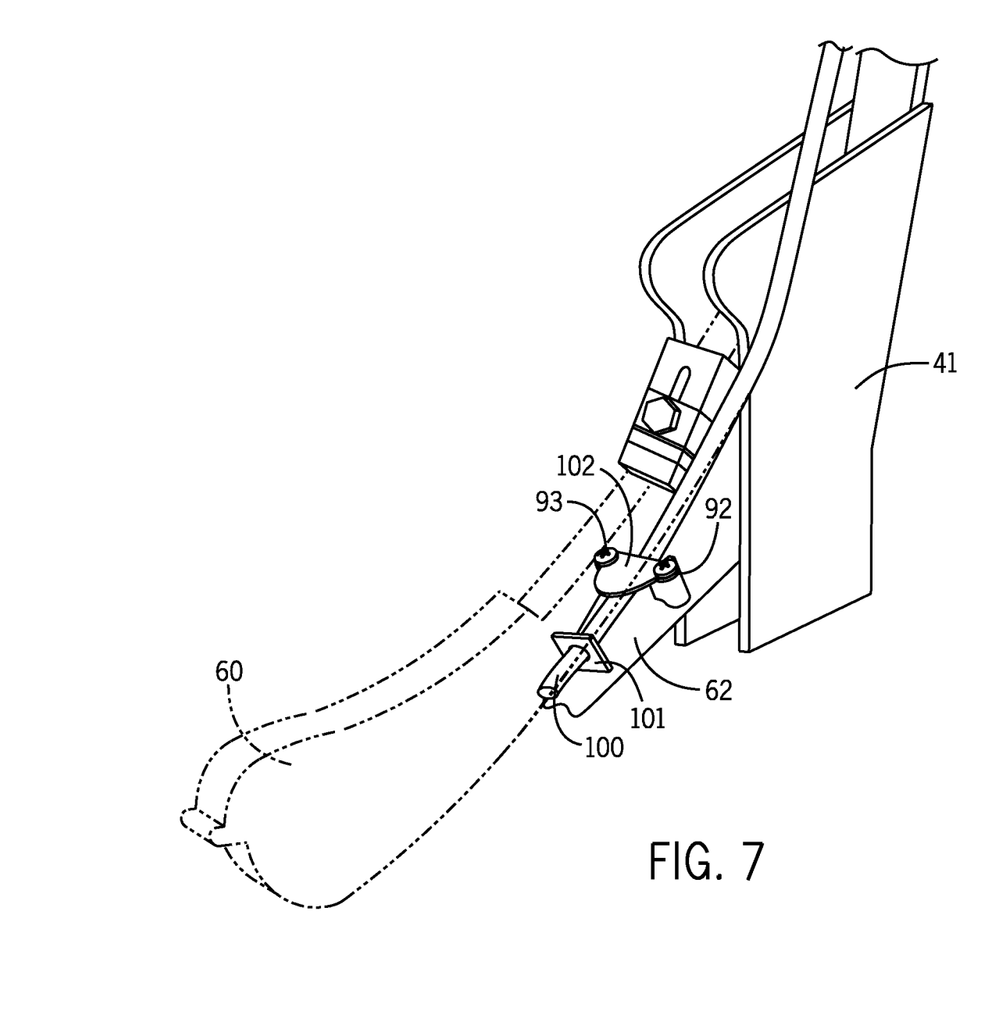
FIG. 7 is a top isometric view of one embodiment of the furrow tool illustrated in FIG. 4 with the furrow tool including a nutrient tube.

The compressor 60 may also include various tabs, hooks, or protrusions 68, 70, 72 located on an upper portion of the compressor body. The protrusions 68, 70, 72 may be used to secure one or more components of a fertilizer tube assembly, such as a fertilizer tube, to the top face 61 of the compressor 60. With reference to FIGS. 7 and 8, the fertilizer tube assembly may include a fertilizer tube. In these embodiments, the fertilizer tube may extend over the top face 61 of the compressor 60. The protrusions 68, 70, 72 may partially wrap around the fertilizer tube or otherwise secure the tube in place along the compressor 60. However, in other embodiments, the protrusions 68, 70, 72 may be omitted. These components may be omitted when a fertilizer tube is not attached to the compressor 60. In some embodiments, the protrusions 68, 70, 72 may be partially curved at their top end, so as to be partially hooked shaped. In other embodiments, the protrusions 68, 70, 72 may be partial walls that are spaced so as to allow a fertilizer tube to extend there between and be substantially secured between each protrusion 68, 70, 72 by a friction fit connection or the like.

The compressor 60 may be connected to an attachment bracket 74 at a neck portion 86 of the compressor body. The neck portion 86 may be slightly bent or rounded towards the ground. In these embodiments, the compressor 60 may be angled generally downwards towards the ground to press the seeds 50 downward in the furrow 56. The angle of the compressor 60 may be increased or decreased to alter the force exerted onto the seeds 50 by the compressor 60.

In some embodiments, the bottom portion 64 of the compressor 60 may be shaped to generally conform to the shape of the furrow 56. For instance, if the furrow 56 has a v-shape, the bottom portion 64 may be shaped to have a relatively small width. The walls from the bottom portion 64 to the top of the compressor 62 may be angled to be substantially the same angle as the walls of the furrow 56. In these embodiments, the compressor 60 may be better able to track the shape of the furrow 56, and thus most efficiently press the seeds 50 into the furrow 56. Additionally, the shape and size of the compressor 60 may be adjusted to accommodate the types of crops being grown and the soil conditions. For instance, some seeds 50 may require significant pressure, whereas other seeds 50 may be easily damaged and thus lighter pressing is required. In these embodiments, the shape of compressor 60 may be changed as well as the material. For example, a lighter material may be used for easily damaged seeds, whereas a heavier material may be used for seeds that can withstand more force. Also, the shape of the compressor 60 may be altered such that the bottom portion 64 may not fit/reach to the bottom of the furrow 56, thus the amount of force applied by compressor 60 to the seeds 50 may be reduced.

The deflector 62 may be secured to the compressor 60 and may extend beyond the width of the compressor 60. In these embodiments, the deflector 62 may be wider than the compressor 60, and the compressor 60 may extend past the deflector 62 and be longer than the deflector 62. In these embodiments, the deflector 62 can direct seeds 50 bouncing in a variety of directions from the seed tube 42. The deflector 62 may curve downwards at a bend point 88. In these embodiments, the deflector 62 may be generally rounded and follow the shape of the compressor 60. The deflector 62 may also be configured to receive fertilizer tubes as shown in FIGS. 7 and 8.

The fertilizer tubes may be attached by fasteners connected at apertures 92 located on a front or top face of the deflector 62. The apertures 92 may be raised above the body of the deflector 62 and be spaced apart from one another. In other embodiments, the apertures 92 may be omitted (for instance if no fertilizing is desired), or the apertures 92 may be located in other areas of the deflector 62. The deflector 62 may be shaped to generally follow the width of the furrow 56 and therefore be better able to deflect the seeds 50 regardless of how the seeds 50 bounce. In some embodiments, the deflector 62 may have rounded sides and a flat front face. However, in other embodiments the deflector 62 may be shaped to accommodate other planter and/or types of furrows 56. For example, if the furrow 56 is shaped wider or formed in a shape other than a V, the deflector 62 may be shaped to mimic that additional width or different shape to provide bounce coverage for the seeds 50.

The attachment bracket 74 may be attached to the compressor 60 and the deflector 62 via the neck portion 86 of the compressor. The neck portion 86 may be integral with the attachment bracket 74, or may be attached via glue, welding, or the like. The attachment bracket 74 secures the furrow tool 52 to the seed tube 42 or other location on the row unit 26. In some embodiments, the furrow tool 52 may be attached to the seed tube 42 via fasteners. The fasteners (not shown) may be attached via fastener apertures 76, 78, 80, 82. In some embodiments, the fasteners may wrap around the seed tube 42 (e.g. wire, string, plastic connectors, or the like), and in other embodiments, the fasteners may be screws, nails, or the like that attach to a bracket or at another attachment area on the seed tube 42.

The attachment bracket 74 may also include projections 84. The projections 84 may assist in attaching the bracket but are not required. The attachment bracket 74 illustrates one embodiment for attaching the furrow tool 52 to the row unit 26. In other embodiments, the furrow tool 52 may be attached in a variety of ways. In some embodiments, the furrow tool 52 may be integrated with the seed tube 42. However, the attachment bracket 74 allows the furrow tool 52 to be used with a variety of planters 10, including different row units 26 and seed tubes 42 since the furrow tool 52 may be attached to a variety of already existing planting devices. The attachment bracket 74 also allows the height of the furrow tool 52 to be readily adjusted so that the compression pressure applied by the compressor 60 and the height of the compressor 60 or the deflector 62 above the bottom of the furrow 56 may be adjusted.

FIGS. 7 and 8 illustrate the furrow tool 52 with fertilizer tubes installed on the furrow tool 52. The furrow tool 52 may include a nutrient tube 100 (as show in FIG. 7) or may include a splitter (as shown in FIG. 8). Referring now to FIG. 7, the nutrient tube 100 may be attached to the deflector 62 via fasteners 93 that attach a securing bar 102 to the deflector 62. The deflector 62 may include an additional securing tab 101. The securing tab 101 may receive the nutrient tube 100 and may be configured to deposit the water, fertilizer, etc. at a desired location in the furrow 56. The nutrient tube 100 may be use to deposit fertilizer, water, nutrient, or the like. The nutrient tube 100 may be connected to a storage tank or other type of container located on the planter 10 or the row unit 26. In some embodiments, the nutrient tube 100 may be configured to be placed between the deflector 62 and the compressor 60. In these embodiments, the nutrient tube 100 may deposit the fertilizer, water, or the like to the seeds 50 before the compressor 60 passes over the seeds 50. However, in other embodiments, the nutrient tube 100 may be longer so that the fertilizer, water, or the like may be delivered to the furrow 56 after the seeds 50 are pressed into the soil.

Referring now to FIG. 8, a splitter 106 may be used to allow the nutrient tube 100 to deposit elements on either side of the seeds 50 within the furrow 56. In these embodiments, the securing tab 101 may not be used to secure the nutrient tube 100 to the furrow tool 52.

In some embodiments, as illustrated in FIGS. 7 and 8, the furrow tool 52 may be secured to the row unit 26 via a bracket 41. The bracket 41 may be used in place of the attachment bracket 74, or used in conjunction with the attachment bracket 74. The seed tube 42 may be inserted into the bracket 41 and secured via a fastener or other mechanism (not shown). The opening 48 of the seed tube 42 may then be angled so as to dispense the seeds 50 into the furrow 56.

In still other embodiments, the nutrient tube 100 may be secured to a top portion of the compressor 60. For example, as shown in FIG. 8, the nutrient tube 100 may be secured to the top face 61 of the compressor 60 via the protrusions 68, 70, 72. The deflector 62 then may be directly adjacent to the bottom 64 of the deflector 62. The nutrient tube 100 may then extend away from the outer protrusion 63 to provide fertilizer and/or nutrients to the seed after it is pressed into the furrow 56. The compressor 60 may further include a splitter 106. The splitter 106 may be configured to provide nutrients to either side of the seeds 50.

All directional references (e.g., upper, lower, upward, downward, left, right, leftward, rightward, top, bottom, above, below, vertical, horizontal, clockwise, and counterclockwise) are only used for identification purposes to aid the reader's understanding of the embodiments of the present invention, and do not create limitations, particularly as to the position, orientation, or use of the invention unless specifically set forth in the claims. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed:

1. A furrow tool configured to attach to a planting device comprising
   a compressor made of a first material comprising:
      a neck portion; and
      a body extending from the neck portion;
   a deflector having a separate structure from the compressor and made from a second material different from the first material and being operatively connected to the compressor, the deflector comprising:
      a top portion operatively connected to the neck portion; and
      an extension portion located beneath a bottom side of the body and configured to deflect seeds; and
   an attachment mechanism operatively connected to the neck portion and configured to attach to the planting device.

2. The furrow tool of claim 1, wherein the deflector further comprises at least one securing aperture on a front face of the extension portion.

3. The furrow tool of claim 2, further comprising a securing tab on the front face of the extension portion below the at least one securing aperture.

4. The furrow tool of claim 2, further comprising
   a nutrient tube positioned adjacent to the at least one securing aperture; and
   at least one fastener where the at least one securing aperture and the at least one fastener substantially secure the nutrient tube on the front face.

5. The furrow tool of claim 4, further comprising a splitter fluidly connected to a first end of the nutrient tube.

6. The furrow tool of claim 4, wherein the at least one securing aperture comprises a first securing aperture and a second securing aperture.

7. The furrow tool of claim 6, further comprising a securing bar operatively connected between the first securing aperture and the second securing aperture and substantially secured to the first securing aperture and the second securing aperture via the at least one fastener, wherein the securing bar secures the nutrient tube on the front face of the extension.

8. The furrow tool of claim 1, further comprising a step disposed between the neck portion and the body, wherein the step reduces a height of the compressor portion as it transitions from the body to the neck portion.

9. The furrow tool of claim 1, wherein the compressor portion increases in height from the neck portion to a back end of the body.

10. The furrow tool of claim 1, wherein the compressor further comprises a bottom surface, and the bottom surface has a width substantially equal to a width of a furrow created by the planting device.

11. A planting tool configured to be attached to a planter row unit, wherein the planter row unit includes a furrow creating device and a seed tube, the planting tool comprising:
 an attachment bracket configured to attach the planting tool to the seed tube;
 a compressor operatively connected to the attachment bracket, comprising
  a neck portion operatively connected to the attachment bracket; and
  a body extending from the neck portion, and the body has a greater height than the neck portion; and
 a deflector operatively connected to the attachment bracket and located beneath a bottom face of the compressor, the deflector has a shorter length than the compressor, and the compressor extends beyond a back end of the deflector.

12. The planting tool of claim 11, wherein when the planting tool is attached to the planter row unit, the deflector is adjacent the seed tube and extends past a first end of the seed tube, and the deflector is disposed between the compressor and the seed tube.

13. The planting tool of claim 11, wherein the body comprises
 a substantially flat bottom with a first width;
 a first side and a second side, the first and second sides increase in height from a front of the body to a back of the body, and the height and a length of the first side and the second side is larger than the first width of the bottom.

14. The planting tool of claim 13, wherein:
 the first side and the second side are substantially curved from the front of the body to the back of the body; and
 the first side and the second side have a substantially flat outer surface.

15. The planting tool of claim 11, wherein the deflector further comprises:
 a first securing aperture and a second securing aperture located on a top face of the deflector;
 an attachment portion operatively attached to the attachment bracket; and
 an extension portion extending from the attachment portion, wherein the extension portion is rounded downwards.

16. The planting tool of claim 15, further comprising a fertilizer tube located between the first securing aperture and the second securing aperture.

17. The planting tool of claim 16, further comprising:
 a securing bar spanning the first securing aperture and the second securing aperture, and the securing bar positioned substantially above the fertilizer tube; and
 a first fastener and a second fastener with the first fastener disposed in the first securing aperture to secure the securing bar at a first location and the second fastener disposed in the second securing aperture to secure the securing bar at a second location.

18. The planting tool of claim 16, further comprising a splitter operatively attached to a first end of the fertilizer tube.

19. The planting tool of claim 11, wherein the attachment bracket comprises at least one aperture configured to receive a fastener securing the attachment bracket to the row unit.

20. The planting tool of claim 11, wherein the compressor comprises a plastic.

* * * * *